United States Patent Office 3,012,795
Patented Dec. 12, 1961

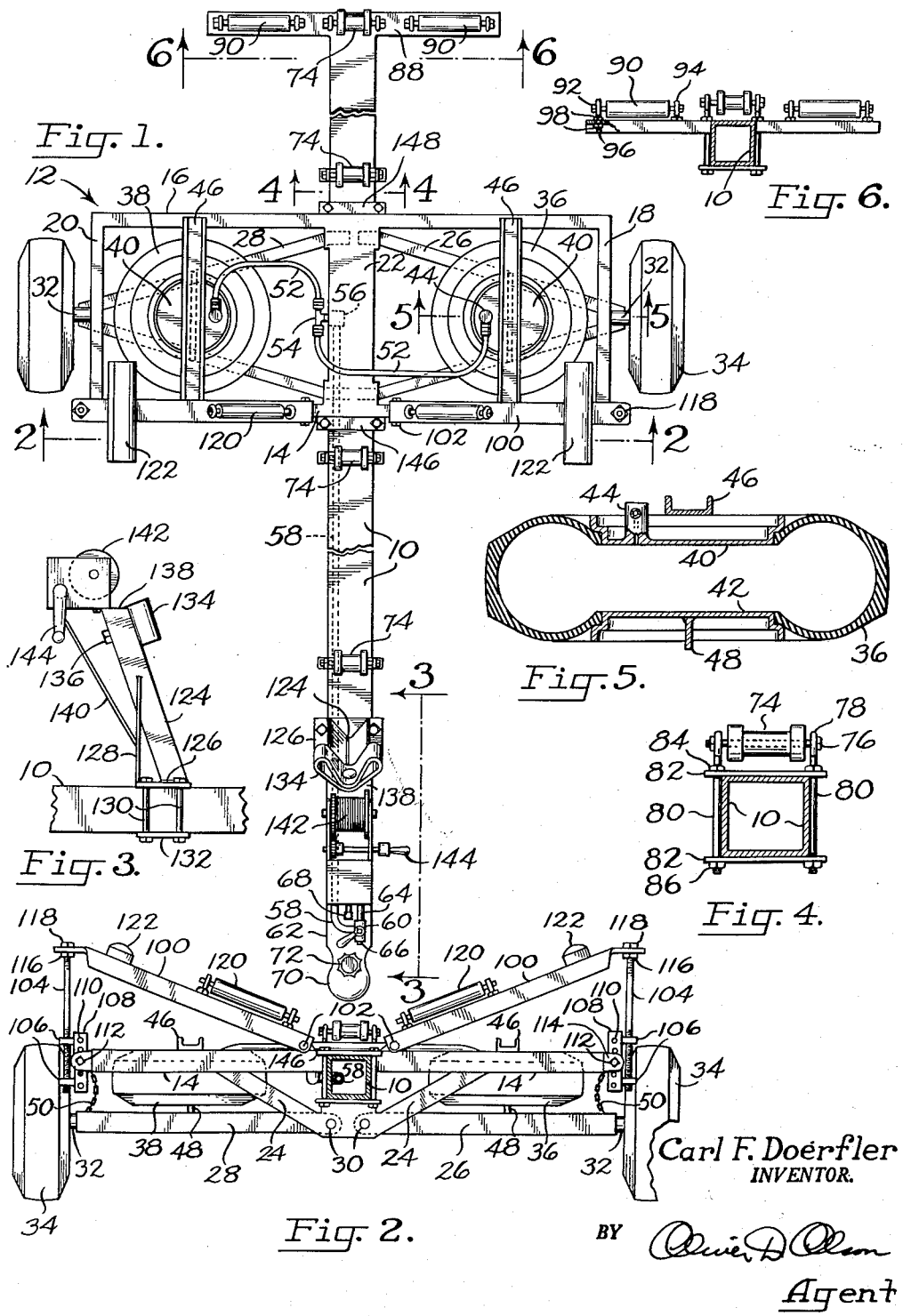

3,012,795
VERTICALLY ADJUSTABLE PNEUMATIC
SUSPENSION FOR BOAT TRAILER
Carl F. Doerfler, 1165 Hines St., Salem, Oreg.
Filed Nov. 26, 1958, Ser. No. 776,474
2 Claims. (Cl. 280—43.23)

This invention pertains to trailers, and relates particularly to the novel construction of a boat trailer by which to facilitate loading, unloading and transport of a boat.

It is a principal object of the present invention to provide a trailer in which the frame thereof is adjustable vertically with respect to the ground through the selective operation of a fluid pressure power system.

Another important object of this invention is the provision of a trailer the frame of which is adjustable vertically relative to the ground by the selective operation of a self-contained fluid pressure power system.

Still another important object of the present invention is the provision of a trailer which includes a fluid pressure power system which performs the dual function of adjusting the trailer frame vertically relative to the ground and also provides a cushioned suspension for the trailer frame.

A further important object of the present invention is the provision of a trailer which includes an air pressure power system for adjusting the trailer frame vertically relative to the ground and for suspending the trailer frame resiliently for a cushioned ride, which air pressure power system includes pneumatic tires which may be interchanged with the ties providing traction support for the trailer.

A still further important object of the present invention is the provision of a trailer in which the frame thereof includes a single longitudinal frame member which functions additionally as a reservoir for compressed air as the source of supply for the compressed air power system for adjusting the trailer frame vertically relative to the ground and for providing a resilient suspension for the trailer frame.

Another important object of this invention is the provision of a trailer which includes longitudinal and transverse frame sections arranged for adjustment relative to each other for accommodating loads of various weights and dimensions.

A further important object of the present invention is the provision of a trailer of simplified construction for economical manufacture, which is collapsible to minimum size for economy and convenience in shipping, which is of rugged construction for heavy duty operation, and which requires a minimum of maintenance and repair.

The foregoing and other objects and advantages of this invention will appear from the following detailed description, taken in connection with the accompanying drawing wherein like reference numerals identify like parts and wherein:

FIG. 1 is a foreshortened plan view of a boat trailer embodying the features of the present invention;

FIG. 2 is a vertical sectional view taken along the line 2—2 in FIG. 1;

FIG. 3 is a fragmentary view in side elevation of the forward section of the boat trailer, as viewed along the line 3—3 in FIG. 1;

FIG. 4 is a vertical sectional view taken along the line 4—4 in FIG. 1;

FIG. 5 is a vertical sectional view taken along the line 5—5 in FIG. 1; and

FIG. 6 is a vertical sectional view taken along the line 6—6 in FIG. 1.

In the preferred embodiment illustrated, the trailer of the present invention includes an elongated longitudinal frame member 10 in the form of a hollow steel tubing, preferably square in cross section. In addition, it also preferably is sealed at its ends to form a pressure tight reservoir for the storage of compressed air, as explained more fully hereinafter.

The longitudinal frame member is associated with a transverse frame assembly 12, preferably in a manner which permits adjustment of the latter along the length of the longitudinal member. In the embodiment illustrated, the transverse frame assembly comprises a rectangular upper framework which includes the longitudinally spaced transverse frame members 14 and 16, the interconnecting longitudinally directed end frame members 18 and 20 and central box frame member 22, and reinforcing brace members 24 which diverge upwardly from the bottom side of the box frame member, adjacent the opposite ends of the latter, for connection to the transverse frame members.

A pair of A-frames 26 and 28 underlie the upper framework and are pivotally connected at their divergent inner ends to the lower portions of the upper frame brackets 24, as by means of the pivot pins 30. The converging outer end of each of the A-frames supports a laterally projecting stub axle 32 which functions to mount a traction wheel 34, in conventional manner.

Interposed between the upper framework and the underlying A-frames are pneumatic suspension tires 36 and 38. In the preferred embodiment of the invention, these tires are identical in size with the traction tires 34, so as to be interchangeable. However, since the suspension tires are to function by vertical expansion and retraction to vary the spacing between the upper framework and the A-frames, the mounting hubs for these tires are different in construction from the wheels which mount the traction tires. Thus, referring particularly to FIG. 5 of the drawing, the suspension tire 36 is shown to be mounted upon axially separated hub sections 40 and 42 which function to seal the central opening in the tire and yet permit a substantial degree of axial separation between the hub sections during inflation and deflation of the tire. One of the hub sections, for example section 40, is provided with an air inlet fitting 44 for purposes of inflating and deflating the tire.

The suspension tire and hub assembly is secured either to the upper framework or to the A-frame. In the embodiment illustrated, attachment is made to the upper framework by means of the longitudinally directed channel member 46 which is welded or otherwise secured both to the transverse frame members 14, 16 and to the hub section 40. The other hub section 42 supports a downwardly projecting bar 48 which is adapted to rest freely upon the upper surface of the A-frame.

It will be appreciated that there is a maximum degree of inflation of the suspension tire 36, and hence a maximum axial separation between the hub sections 40 and 42, beyond which the hub sections will be separated from the tire. Accordingly, means is provided for limiting this degree of inflation. In the embodiment illustrated, this means is provided by a length of chain 50 which interconnects the upper framework and the underlying A-frames, adjacent the outer ends thereof. The lengths of chain are chosen to permit the desired maximum expansion of the suspension tires, at which point the chains become taut and prevent further separation of the frame sections.

Means is provided for inflating and deflating the suspension tires. Although the air fittings 44 may be in the form of conventional tire valve assemblies for individual inflation and deflation in the manner of a conventional tire, the arrangement illustrated in the drawing is preferred. In the illustrated embodiment each air fitting is connected through a length of air hose 52 to a T-connection 54 which, in turn, is removably threaded into an elbow fitting 56. This elbow fitting is contained within the hollow longitudinal frame member 10 and is mounted in a lateral opening in the side wall of the longitudinal frame member, being sealed therein as by welding to preserve the pressure tight condition.

An air conduit 58 is connected to the other end of the elbow fitting and extends forwardly through the hollow longitudinal frame member and the front wall of the latter. A pressure tight seal is provided between the conduit and the front wall as by welding or other conventional means. The forward end of the air conduit is connected to the air pressure outlet of a three-way valve 60 mounted on a forward extension 62 of the longitudinal frame member 10.

The air pressure inlet of the valve is connected to a length of air conduit 64 which extends through the front wall of the longitudinal frame member for communication with the interior thereof. A pressure tight seal is provided between the conduit and wall, in the manner previously described.

The three-way valve also is provided with an exhaust outlet 66 which, in one position of adjustment of the valve handle, communicates with the air conduit 58 leading to the suspension tires, for purposes of deflating the latter. In another position of adjustment of the valve handle, the air conduits 58 and 64 are interconnected for purposes of inflating the suspension tires from the supply of air pressure contained within the hollow longitudinal frame member. In a third position of adjustment of the valve handle the air inlet, outlet and exhaust are isolated from each other.

Means also is provided for introducing compressed air into the hollow longitudinal frame member 10. In the embodiment illustrated, a conventional tire valve 68 is mounted in the front end wall for communication with the interior of the reservoir, to facilitate filling of the latter with compressed air from a source conveniently available at any automotive service station.

The forward end of the extension 62 includes a conventional trailer hitch socket 70 and locking mechanism, operated by the hand wheel 72, for releasable engagement with a conventional trailer hitch ball mounted on the rear end of a vehicle, as is well known.

A plurality of boat keel guide rollers 74 are mounted removably and adjustably at spaced intervals along the length of the longitudinal frame member 10. In the preferred embodiment illustrated, and best shown in FIG. 4, each of these rollers is mounted rotatably on a pivot bolt 76 which is supported adjacent its opposite ends in the loops 78 of a pair of laterally spaced eye bolts. The shanks 80 of these bolts extend downward through openings in a pair of clamping bars 82 which extend across the top and bottom surfaces of the longitudinal frame member 10. Stop nuts 84 are threaded onto the bolt shanks for abutment against the top clamping bar, and lock nuts 86 are threaded onto the lower ends of the eye bolt shanks for drawing the clamping bars into firm engagement with the longitudinal frame member.

It will be understood that the position of elevation of the rollers 74 above the frame member may be varied by appropriate adjustment of the abutment nuts 84. Further, it will be understood that the arrangement of eye bolts and clamping bars permits ready adjustment of the rollers along the length of the longitudinal frame member, as well as complete removal therefrom.

The rearward end of the longitudinal frame member 10 also supports a transverse channel bracket 88 which extends laterally to opposite sides of the longitudinal frame member. Each laterally extending portion of this bracket supports a smooth surface roller 90. These rollers function to support bottom side portions of a boat, and since such portions may be rounded or otherwise directed angularly with respect to the keel, the rollers are mounted for angular as well as vertical adjustment. To this end, each roller is supported rotatably upon a pivot bolt 92 (FIG. 6) which is supported adjacent its opposite ends in the loops 94 of a pair of laterally spaced eye bolts, the shanks 96 of which extend through openings in the bracket 88 and secured adjustably therein by the adjustable lock nuts 98 threaded onto the shank and abutting opposite surfaces of the bracket.

Additional lateral boat supports preferably are provided for supporting the bottom of the boat intermediate the ends of the latter. In the illustrated embodiment, such support comprises a pair of laterally directed channel brackets 100 which are mounted pivotally at their inner ends on pivot bolts 102 supported by the transverse frame member 14. The outer end of each of these brackets is apertured to receive a downwardly depending adjustment bolt 104, the threaded shank of which is received through a pair of vertically spaced tapped lugs 106 which project laterally outward from a channel iron base 108. The spaced sides of this base are provided with registering pairs of vertically spaced openings 110 adapted selectively to receive therethrough a pivot bolt 112 mounted on spaced ears 114 projecting laterally outward from the side members 18, 20 of the upper framework.

The outer end of the bracket 100 is supported upon a backing nut 116, between the latter and the bolt head 118. Thus, by rotation of the adjustment bolt, as by means of a tool applied to the bolt head, the adjustment bolt shank is moved vertically through the threaded lugs to establish the desired angular position of the brackets 100. Each of these brackets supports a smooth roller 120 adjacent its inner end, the roller being mounted adjustably in the manner of the rollers 90 previously described. The outer end of the bracket 100 supports a longitudinally extending padded bar 122, as is well known.

Also mounted adjustably and removably adjacent the forward end of the longitudinal frame member 10, is a bow support. In the preferred embodiment illustrated, and best shown in FIG. 3, this support comprises an elongated post 124 which preferably is V-shaped in cross section and which is mounted upon a base plate 126. The post projects obliquely upward from the base plate, in the direction of the forward end of the longitudinal frame member. Reinforcement between the base plate and post is provided by the upstanding brace 128. Bolts 130 extend downward through the base plate and an underlying clamping plate 132, and these bolts are fitted with securing nuts by which the assembly may be clamped adjustably to the longitudinal frame member.

An anchor pad 134 preferably is attached adjacent the upper end of the post 124 for protecting the bow of a boat as the latter is drawn into position against the post. In the embodiment illustrated, the anchor pad comprises a ring of resilient material, such as rubber or hose fabric, which is collapsed upon itself and secured within the V-shaped post as by means of the bolt 136.

A horizontal platform 138 is secured to the upper end of the post 124 and projects forwardly therefrom, being reinforced adjacent its forward end by the rod 140 which is secured at its lower end to the upstanding brace 128. The platform serves as a support for a cable winch. Although many types are available, the winch illustrated includes a cable drum 142 which is rotated by means of the hand crank 144. In any case, the winch functions to wind and unwind a drum cable connected at its free end to the bow of a boat, whereby to facilitate the loading and unloading of a boat from the trailer.

A particular advantage attending the use of the adjustable boat supporting rollers and bow post resides in the adaptability of the trailer to boats of various sizes. In this regard, it is also desirable that the transverse frame assembly 12 be adjustable along the length of the longitudinal frame member 10. This is accommodated in the embodiment illustrated by virtue of the sliding arrangement of the longitudinal frame member and the box frame section 22. The transverse frame assembly is secured in any desired position of adjustment by means of the pairs of clamping bars 146, 148 interconnecting bolts positioned against the longitudinal ends of the box frame section.

In order to permit a substantial degree of adjustment of the transverse frame assembly 12 along the longitudinal frame member 10, the major intermediate portions of the side plates of the box frame section 22 are cut away to accommodate movement relative to the T-coupling 54 projecting from the longitudinal frame member.

Another advantage attending the illustrated arrangement of adjustable supporting rollers, bow post and transverse frame assembly, resides in the fact that these components may be completely removed from the longitudinal frame member. Removal of the transverse frame assembly is achieved by disconnecting the T-coupling 54, the forward clamping bar assembly 146, the rollers 74 and bow-support assembly 124—144, and sliding the transverse frame assembly off the forward end of the longitudinal frame member. In this regard it is to be noted that the three-way valve 60 and the trailer hitch locking knob 72 are confined within the cross sectional dimensions of the longitudinal frame member, to permit removal of the transverse frame assembly.

It is to be noted that the transverse frame assembly is substantially symmetrical in design, and therefore may be mounted upon the longitudinal frame member with either longitudinal end facing forward.

As stated hereinbefore, it is desirable that the suspension tires 36 and the traction tires 34 be identical in size. With such an arrangement the suspension tires may serve as spares for the traction tires and replace the latter when the tread is worn to an unsafe condition.

The operation of the boat trailer described hereinbefore, is as follows: When it is desired to load a boat upon the trailer, with the latter secured to a vehicle at the trailer hitch connection, the three-way valve 60 is manipulated to connect the air conduit 58 to the exhaust opening 66, whereupon the air pressure in the suspension tires is relieved and the upper hub sections 40 move toward the lower sections 42 under the weight of the upper framework. As the upper framework thus moves toward the underlying A-frames 26 and 28, the rearward end of the longitudinal frame member 10 is lowered toward the ground. When the rearward end of the longitudinal frame member is lowered onto the ground or to any desired position elevated above the ground, the three-way valve is adjusted to the sealing position.

The boat is then loaded onto the trailer, conveniently through the assistance of the cable and winch, the keel of the boat being guided by the rollers 74 until the bow is brought snugly into contact with the anchor pad 134 on the post 124. The adjustment bolts 104 then are manipulated to elevate the brackets 100 until the pads 122 snugly engage the bottom sides of the boat.

The three-way valve 60 then is turned to interconnect the air conduits 58 and 64, whereupon compressed air from the reservoir provided by the hollow longitudinal frame member 10, enters and inflates the suspension tires 36, 38. As the upper hub sections 40 of the tires move upwardly away from the lower hub sections 42, the space between the upper transverse framework and the underlying A-frames, is increased. When the rearward end of the longitudinal frame member thus is elevated to desired position, the three-way valve is adjusted to the sealing position.

The reservoir is of sufficient capacity and strength to provide a supply of compressed air sufficient to accommodate many successive inflations of the suspension tires. Accordingly, refilling of the reservoir is required only infrequently, and is accomplished very simply and conveniently by the attendant of a nearby service station.

It will be apparent to those skilled in the art that various changes may be made in the details of construction described hereinbefore. For example, the upper transverse frame assembly may be provided as an integral part of the longitudinal frame, if the feature of longitudinal adjustability and disassembly is not important. The suspension tires may be replaced by other forms of expandable means, but it is preferred to use tires of the same size or of sizes which accommodate interchangeability with the traction tires. These and other changes may be made without departing from the spirit of this invention and the scope of the appended claims.

Having now described my invention and the manner in which the same may be used, what I claim as new and desire to secure by Letters Patent is:

1. A trailer comprising an elongated hollow sealed longitudinal frame member adapted to contain compressed air, a transverse upper frame including a central guide member adapted to receive the elongated longitudinal frame member slidably therein, securing means releasably connecting the longitudinal frame member and transverse frame together, a pair of traction wheels including pneumatic traction tires, a pair of wheel supporting frames underlying the transverse upper frame and extending laterally outward with respect to the longitudinal frame member and supporting the traction wheels at the outer ends thereof, pivot means interconnecting the inner ends of the wheel supporting frames and the transverse upper frame, a pair of vertically expandable annular suspension tires each interposed between the transverse upper frame and one of the wheel supporting frames, each suspension tire having upper and lower hub sections separated freely from each other and operable to seal the interior of the tire, the lower hub section engaging the associated wheel supporting frame and the upper hub section engaging the transverse upper frame, a tire valve on the hollow sealed longitudinal frame member communicating with the interior thereof for filling the latter with compressed air, a compressed air conduit interconnecting the interior of the hollow sealed longitudinal frame member and the suspension tires, a control valve in the conduit for connecting the suspension tires selectively to the interior of the hollow sealed longitudinal frame member and to the atmosphere, the suspension tires being operable by compressed air from the hollow sealed longitudinal frame member to expand their hub sections apart and force the transverse upper frame upwardly away from the wheel supporting frames, the traction tires and suspension tires being interchangeable.

2. A trailer comprising an elongated longitudinal frame member, a transverse upper frame secured to the longitudinal frame member, a pair of traction wheels including pneumatic traction tires, a pair of wheel supporting frames underlying the transverse upper frame and extending laterally outward with respect to the longitudinal member and supporting the traction wheels at the outer ends thereof, pivot means interconnecting the inner ends of the wheel supporting frames and the transverse upper frame for varying the vertical spacing between said frames, a pair of vertically expandable annular suspension tires each interposed between the transverse upper frame and one of the wheel supporting frames, each suspension tire having upper and lower hub sections separated freely from each other and operable to seal the interior of the tire, the lower hub section engaging the associated wheel supporting frame and the upper hub section engaging the transverse upper frame, the suspension tires being operable upon introduction thereinto of compressed air to expand their hub sections apart and force the transverse upper frame upwardly away from the wheel supporting frames, whereby to elevate the longitudinal frame member, the suspension tires also being operable upon removal therefrom of compressed air to draw their hub sections toward each other and lower the transverse upper frame downwardly toward the wheel supporting frames, whereby to lower the longitudinal frame member.

(References on following page)

References Cited in the file of this patent

UNITED STATES PATENTS

| | | |
|---|---|---|
| 689,001 | Hill | Dec. 17, 1901 |
| 2,624,594 | Gouirand | Jan. 6, 1953 |
| 2,704,665 | Zoltok | Mar. 22, 1955 |
| 2,755,099 | Smith | July 17, 1956 |
| 2,766,053 | Madruga | Oct. 9, 1956 |
| 2,788,908 | Lynd | Apr. 16, 1957 |
| 2,844,385 | Pribonic | July 22, 1958 |
| 2,865,652 | Easton | Dec. 23, 1958 |
| 2,947,547 | Gouirand | Aug. 2, 1960 |
| 2,950,124 | Pribonic | Aug. 23, 1960 |

FOREIGN PATENTS

| | | |
|---|---|---|
| 1,137,237 | France | Jan. 7, 1957 |